United States Patent
Hood et al.

(10) Patent No.: US 7,498,094 B2
(45) Date of Patent: Mar. 3, 2009

(54) THERMAL ENERGY MANAGEMENT IN ELECTROCHEMICAL FUEL CELLS

(75) Inventors: Peter David Hood, Leicester (GB); Philip John Mitchell, Loughborough (GB); Paul Leonard Adcock, Leicestershire (GB); Jonathan Cole, Leicestershire (GB)

(73) Assignee: Intelligent Energy Limited, London (GB)

( * ) Notice: Subject to any disclaimer, the term of this patent is extended or adjusted under 35 U.S.C. 154(b) by 189 days.

(21) Appl. No.: 10/535,532

(22) PCT Filed: Nov. 20, 2003

(86) PCT No.: PCT/GB03/05057

§ 371 (c)(1),
(2), (4) Date: May 15, 2006

(87) PCT Pub. No.: WO2004/049481

PCT Pub. Date: Jun. 10, 2004

(65) Prior Publication Data

US 2006/0257699 A1    Nov. 16, 2006

(30) Foreign Application Priority Data

Nov. 22, 2002  (GB)  .................................. 0227263.1

(51) Int. Cl.
*H01M 8/04* (2006.01)
*H01M 8/10* (2006.01)

(52) U.S. Cl. .......................................... 429/26; 429/30
(58) Field of Classification Search .................... 429/22, 429/24, 25, 26, 30
See application file for complete search history.

(56) References Cited

U.S. PATENT DOCUMENTS

| 5,366,818 | A | 11/1994 | Wilkinson et al. ............. 429/13 |
| 6,015,634 | A * | 1/2000 | Bonville et al. ............. 429/26 X |
| 6,777,120 | B2 * | 8/2004 | Nelson et al. ............. 429/24 X |
| 6,939,635 | B2 * | 9/2005 | Ballantine et al. ............. 429/24 |
| 7,191,858 | B2 * | 3/2007 | Vanderwees et al. ........ 429/26 X |
| 2001/0053470 | A1 | 12/2001 | Misumi ...................... 429/26 |

FOREIGN PATENT DOCUMENTS

EP    1056148    11/2000

(Continued)

OTHER PUBLICATIONS

International Search Report for Application No. PCT/GB03/05057, Feb. 2005.

(Continued)

*Primary Examiner*—Stephen J. Kalafut
(74) *Attorney, Agent, or Firm*—Fish & Richardson P.C.

(57) ABSTRACT

A fuel cell assembly supplies water and water vapour by-product to a cooling water circuit delivered to a thermal storage tank from which it can be recycled to the fuel cell stack as direct input to the membrane electrode assemblies, for use as fuel/oxidant preheat and/or direct water injection to the membrane electrode assembly. The purity of water delivered to the membrane is thereby assured. The thermal storage tank allows for a decoupling of the thermal and electrical loads on the fuel cell stack in a combined heat and electrical power delivery unit. Under low external electrical loads, the fuel cell stack and its cooling circuit may be used at high capacity to provide hot water.

21 Claims, 6 Drawing Sheets

FOREIGN PATENT DOCUMENTS

| | | |
|---|---|---|
| EP | 1056148 A2 | 11/2000 |
| EP | 1168476 A2 | 1/2002 |
| JP | 60124366 | 7/1985 |
| JP | 2000 018718 | 1/2000 |
| JP | 2000-0185356 | 6/2000 |
| JP | 2001-325982 | 11/2001 |
| JP | 2002 008690 | 1/2002 |
| JP | 2002 075427 | 3/2002 |

OTHER PUBLICATIONS

Search Report for Application No. GB0227263.1, Apr. 2004.
Response to Communication in Counterpart EP Application No. 03811803.0, dated Dec. 7, 2006.

* cited by examiner

THERMAL ENERGY MANAGEMENT IN ELECTROCHEMICAL FUEL CELLS

TECHNICAL FIELD

The present invention relates to fuel cells of the type in which fuel and oxidant are combined at a membrane-electrode assembly to generate electrical energy and a reaction product, namely water vapour.

BACKGROUND

Figure 1:
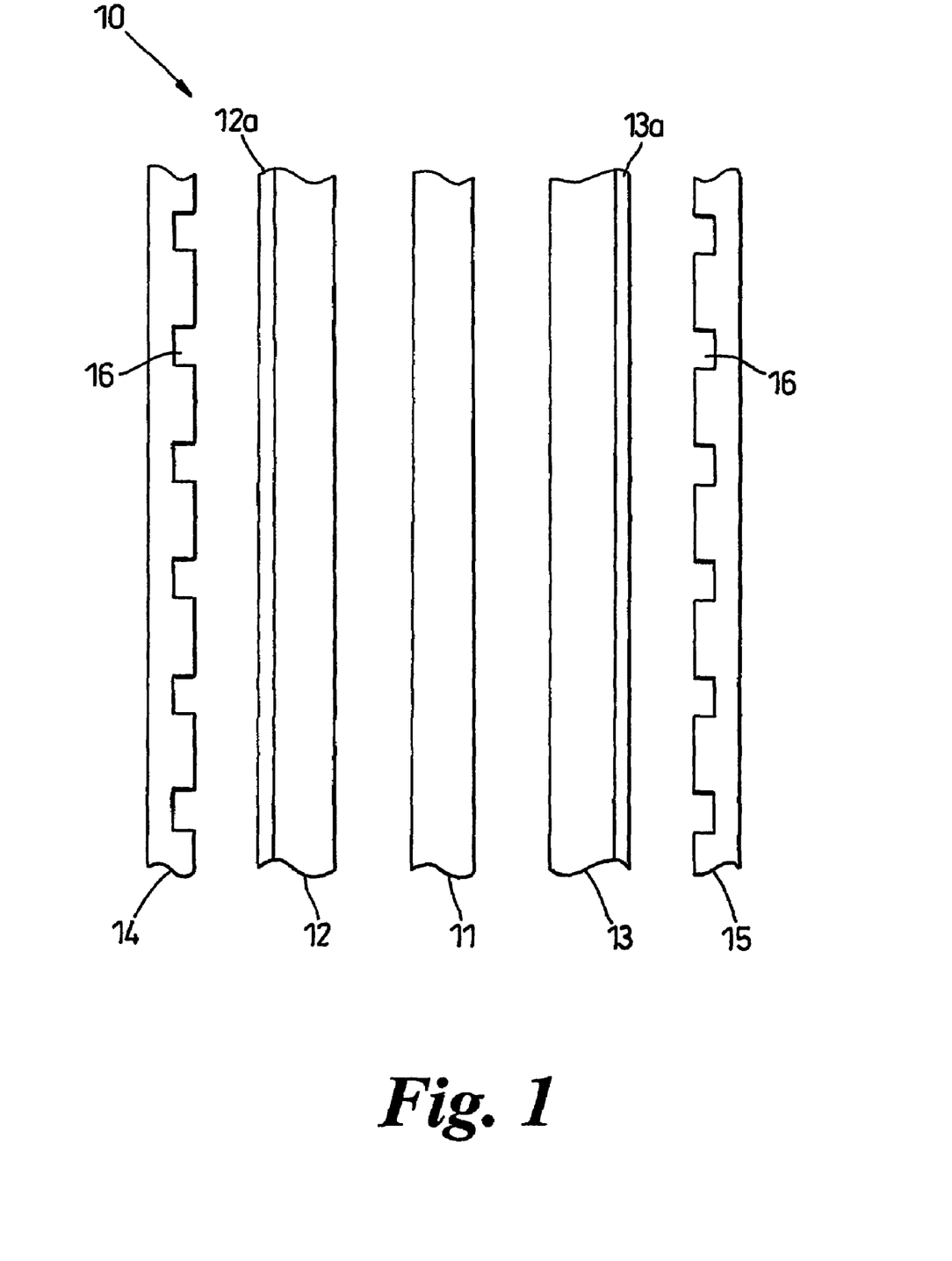
FIG. 1 is a schematic cross-sectional view through a part of a conventional fuel cell.

A typical layout of a conventional fuel cell 10 is shown in FIG. 1 which, for clarity, illustrates the various layers in exploded form. A solid polymer ion transfer membrane 11 is sandwiched between an anode 12 and a cathode 13. Typically, the anode 12 and the cathode 13 are both formed from an electrically conductive, porous material such as porous carbon, to which small particles of platinum and/or other precious metal catalyst are bonded. The anode 12 and cathode 13 are often bonded directly to the respective adjacent surfaces of the membrane 11. This combination is commonly referred to as the membrane-electrode assembly, or MEA.

Sandwiching the polymer membrane and porous electrode layers is an anode fluid flow field plate 14 and a cathode fluid flow field plate 15 which deliver fuel and oxidant respectively to the MEA. The fluid flow field plates 14, 15 are formed from an electrically conductive, non-porous material by which electrical contact can be made to the respective anode electrode 12 or cathode electrode 13. At the same time, the fluid flow field plates must facilitate the delivery and/or exhaust of fluid fuel, oxidant and/or reaction product to or from the porous electrodes.

This is conventionally effected by forming fluid flow passages in a surface of the fluid flow field plates, such as grooves or channels 16 in the surface presented to the porous electrodes 12, 13. Hydrogen and/or other fluid fuels or fuel mixes are delivered to the anode channels. Oxidant, typically oxygen or ambient air is delivered to the cathode channels, and reactant product water and/or water vapour is extracted from the cathode channels.

Figure 2:
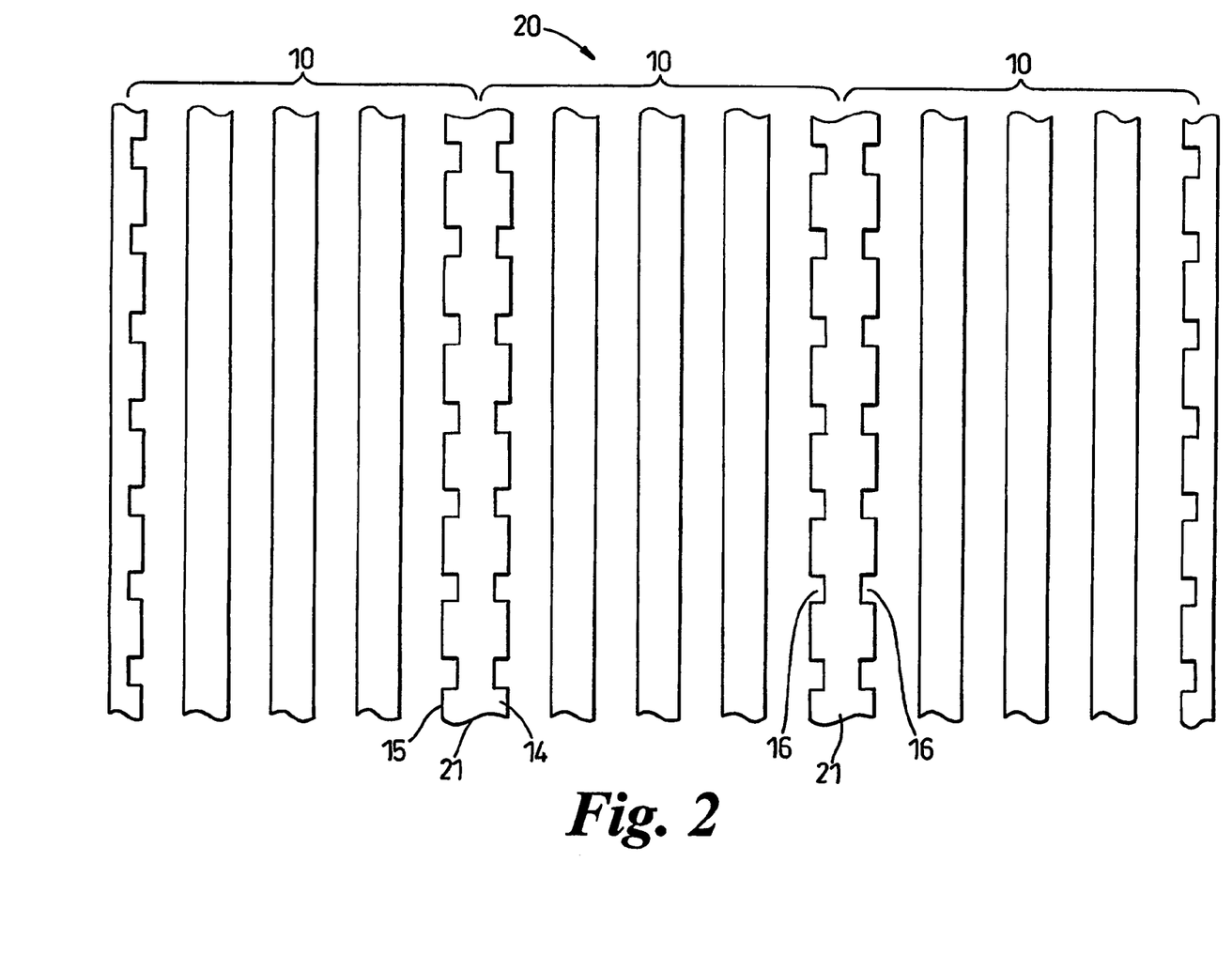
FIG. 2 shows a schematic cross-sectional view through a part of a conventional fuel cell stack.

With reference to FIG. 2, usually a large number of fuel cells 10 are arranged in a stack 20, such that the anode 14 of one cell is adjacent to and electrically connected to the cathode 15 of the next cell (preferably using a combined fluid flow field plate 21 as shown), the voltages from each cell successively adding to produce a requisite supply voltage.

There has been considerable interest in fuel cells as an efficient means for providing localised electrical power supplies to domestic and light industrial premises, particularly in remote areas where construction of large power supply networks is costly.

An aspect of the electrochemical fuel cell is that a certain amount of heat is generated within the fuel cell during the electricity generation process. Conventionally, this heat has been regarded as a waste by-product that is extracted together with the water vapour and simply lost.

A certain amount of heat in the MEA and fluid flow field plates is, in fact, desirable to obtain optimum operating conditions, but this must be kept strictly under control, particularly when electrical demand on the fuel cell is high. Control of the heat is existing fuel cell generally utilises one or both of two different cooling mechanisms.

In a first mechanism, liquid phase cooling is used in which water is delivered to and extracted from separate cooling plates located between selected fluid flow plates within the stack 20. Commonly, a cooling plate is positioned between every fourth or fifth anode/cathode field plate pair. Water extracted from the cooling plates is passed through a heat exchanger and recirculated into the cooling plates.

In a second mechanism, vapour phase cooling is used to extract heat from the active fluid flow plates by delivering controlled amounts of water to the MEA 11, eg. directly to the electrode surfaces or into the channels 16 of the fluid flow field plates 14, 15, which water is vaporised and extracted from the cathode exhaust. This technique has the advantage of not only supplying the water to maintain an appropriate membrane water content but it also acts to cool the fuel cell through evaporation and extraction of latent heat of vaporisation.

However, because the water is being delivered into the working MEA of the fuel cell, it is important to use water of adequate purity such that the quality and performance of the membrane 11 is not compromised. In some remote environments, a consistent supply of such water quality is difficult to guarantee and may not be under the control of the fuel cell operator.

In general, the cooling systems for cooling plates and vapour phase extraction from the cathode exhaust are not compatible in that the inlet and outlet temperatures are different, and conventionally, separate heat exchanger circuits are required. This results in increased complexity, cost and size of the overall fuel cell energy system.

SUMMARY

It is an object of the present invention to provide an efficient and/or simple thermal management system for fuel cells so that waste of heat by-product from electricity generation is reduced.

It is a further object of the present invention to provide a cooling circuit for a fuel cell stack such that purity of cooling water delivered to the MEA can be readily maintained.

It is a further object of the invention to provide a thermal cooling and energy management system which can readily meet the thermal dissipation demands of a high power-fuel cell with only a single heat exchanging circuit, under varying conditions of electrical demand.

Some or all of the objects of the invention are met by various embodiments as described herein.

According to one aspect, the present invention provides a fuel cell assembly comprising:

a fuel cell stack having at least one inlet port for receiving cooling water and at least one outlet port for discharging water and/or water vapour, the inlet port and the outlet port each communicating with at least one membrane-electrode assembly of the fuel stack; and    a thermal storage tank having a heat exchanger conduit therethrough, the heat exchanger conduit having an inlet and an outlet coupled respectively to the at least one outlet port and the at least one inlet port of the fuel cell stack to form a cooling circuit for the fuel cell stack.

According to another aspect, the present invention provides a method of operating a fuel cell assembly comprising the steps of:

feeding fuel and oxidant into a fuel cell stack to generate electrical current and water/water vapour by-product;

feeding the water/water vapour into a heat exchanger conduit of a thermal storage tank and extracting heat energy therefrom;

retrieving water and vapour condensate from the heat exchanger conduit and supplying it back to a membrane-electrode assembly in the fuel stack; and    storing the thermal energy in the thermal storage tank, the fuel cell stack and heat exchanger conduit forming a water cooling circuit.

DESCRIPTION OF THE DRAWINGS

Embodiments of the present invention will now be described by way of example and with reference to the accompanying drawings in which.

DETAILED DESCRIPTION

Figure 3:
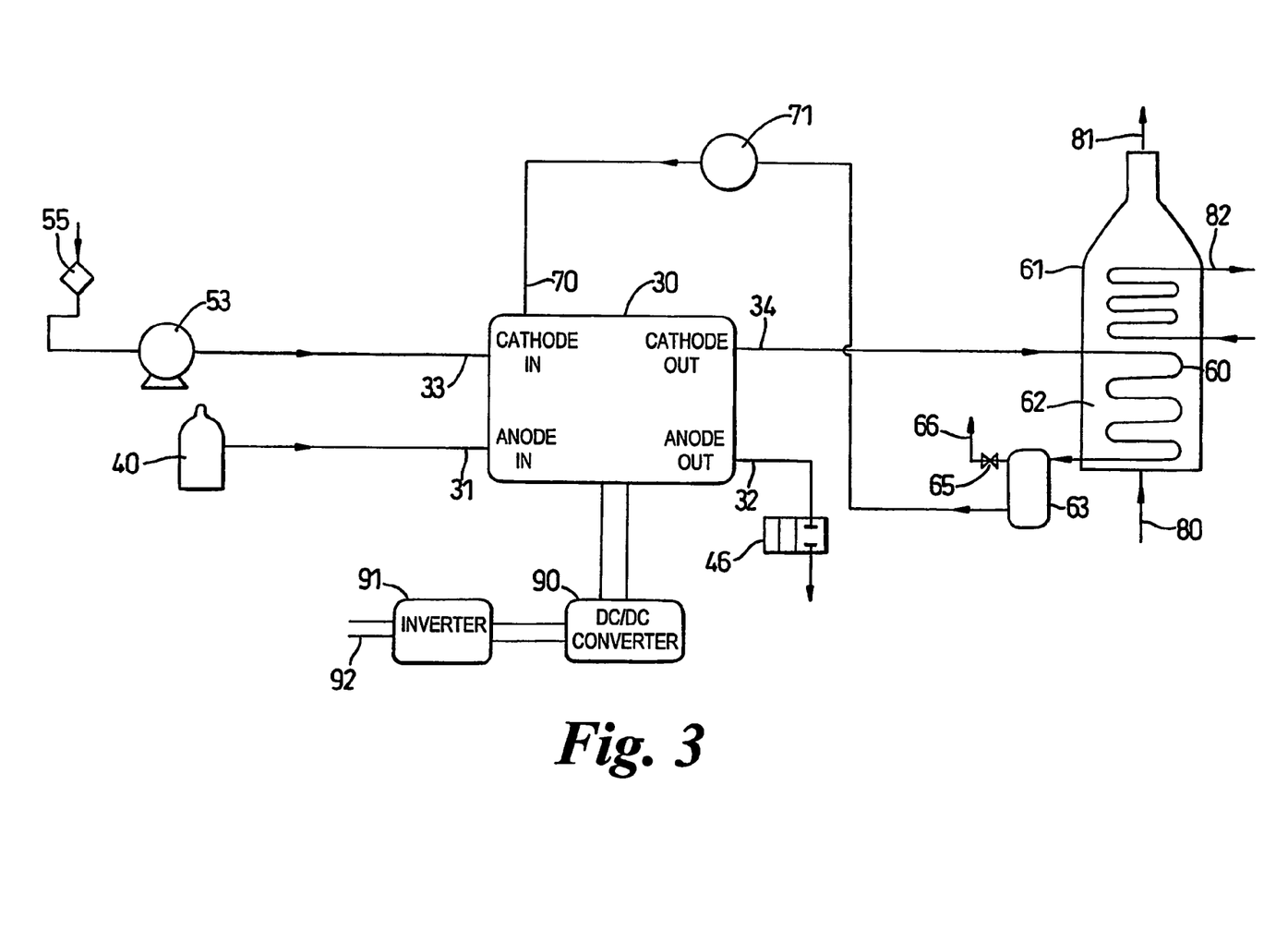
FIG. 3 is a schematic diagram of a thermal energy management system for providing combined heat and electrical power from an electrochemical fuel cell.

With reference to FIG. 3, a thermal energy management system and combined heat and electrical power control system for use with a fuel cell is now described. A fuel cell stack 30 comprises a number of fuel cells suitable for meeting the overall power requirements of the system. A fuel supply, typically of hydrogen supplied from a hydrogen tank 40 or reformer unit, is coupled to anode inlet 31 which supplies fluid fuel to the anode plates in the fuel cell stack. An anode purge outlet 32 is provided to facilitate purging of the anode fluid flow plates, for example, to eliminate water build up in the anode side of the MEAs, or to allow feedback to the combustion section of a reformer-based fuel processor.

The fuel supply may include an appropriate pre-heat mechanism, preferably using heat generated by the fuel cell stack itself or using an electrical heater during start up.

The anode fluid flow control system may also include a purge valve 46, connected to the anode outlet 32, for enabling intermittent purging of the anode.

An oxidant supply, typically of air, is provided to cathode inlet 33, which supplies oxidant to the cathode plates in the fuel cell stack 30. A cathode outlet 34 (or 'cathode exhaust') is provided to facilitate purging of unconsumed oxidant, together with diluent or inert gases if any, and reactant by-products (including water).

In a preferred configuration, as shown, the oxidant supply is drawn from the ambient air by way of an air compressor 53 through a filter 55 which ensures that an appropriate volume of oxidant is being supplied to the fuel cell under the prevailing load conditions.

The cathode outlet 34 is coupled to a heat exchanger pipe 60 in a thermal storage tank 61. Preferably, the heat exchanger pipe 60 is a coil which passes through a water jacket 62 of the thermal storage tank. However, generally, the heat exchanger pipe may be any suitable conduit through which the water/water vapour from cathode output 34 may pass into and through any suitable thermal transfer device. The heat exchanger pipe leads to a water collection vessel 63 for collecting the water and steam condensate.

Water from the condensate collection vessel 63 is fed back to the fuel cell stack anodes and/or cathodes at water inlet 70, where it is used to perform one or more functions useful for maintaining optimum operating conditions within the fuel cell stack 30. For example, the warm water may be used to pre-heat fuel and/or oxidant.

The water may be used to humidify the inlet fuel and/or oxidant stream, again assisting in maintaining an appropriate level of reaction rate at the MEA and prolonging the life of the membrane. The water may alternatively be injected directly into fluid flow field plate channels, on the anode side and/or on the cathode side, where it may assist in one or more of: temperature control of the MEA by re-evaporation; humidification of the membrane; and pre-heating of the fuel and/or oxidant.

In general terms, the water and/or water vapour emerging from the cathode outlet 34 is directed round a cooling circuit comprising the heat exchanger pipe 60, the condensate collection vessel 63 and the water inlet 70.

In preferred embodiments, the cooling circuit also comprises a water pump 71 for maintaining an appropriate flow rate at inlet 70.

Preferably, the condensate collection vessel 63 also includes an exhaust outlet 66 and associated pressure regulation valve 65 for dispersing waste gases and water from the cooling circuit as required. The pressure regulation valve facilitates an increased power delivery of the fuel cell by operating the fuel cell at higher inlet air pressure, as desired. The pressure regulation valve allows the controlled escape of cathode gas exhaust and any carrier or inert gases, at a predetermined pressure level. The pressure regulation valve thereby provides a control mechanism for controllably exhausting waste gases from the cooling circuit.

It will be noted that the cooling circuit uses water that has been generated by the fuel cell stack 30 during the combination of hydrogen and oxygen at the MEA, and maintains this water supply. Therefore, the water purity remains high and it can be used for direct water injection into fuel and/or oxidant supplies. The water by-product of the fuel cell stack does not constitute a significant risk of poisoning or otherwise compromising the performance of the MEA in the fuel cell stack.

The water in the heat exchanger conduit 60 is preferably completely isolated from the water in the water jacket 62 which may be replenished from local water supplies of uncertain integrity using cold water feed 80. Hot water for use in the domestic or commercial premises may be drawn off at hot water outlet 81. Space heating in the domestic or commercial premises may also be provided by supplying hot water to a radiator system (not shown) using a secondary water circuit 82.

It will be understood that the water and space heating supplies provided by the storage tank 61 may be solely provided by the fuel cell stack 30, or merely assisted by the fuel cell stack 30.

A particular advantage of the described arrangement, apart from the maintenance of a high purity water cooling circuit, is that the fuel cell can be guaranteed an appropriate thermal cooling capacity under all external electrical load conditions. A DC/DC converter 90 and inverter 91 provide a supply 92 to external electrical loads.

Figure 4:
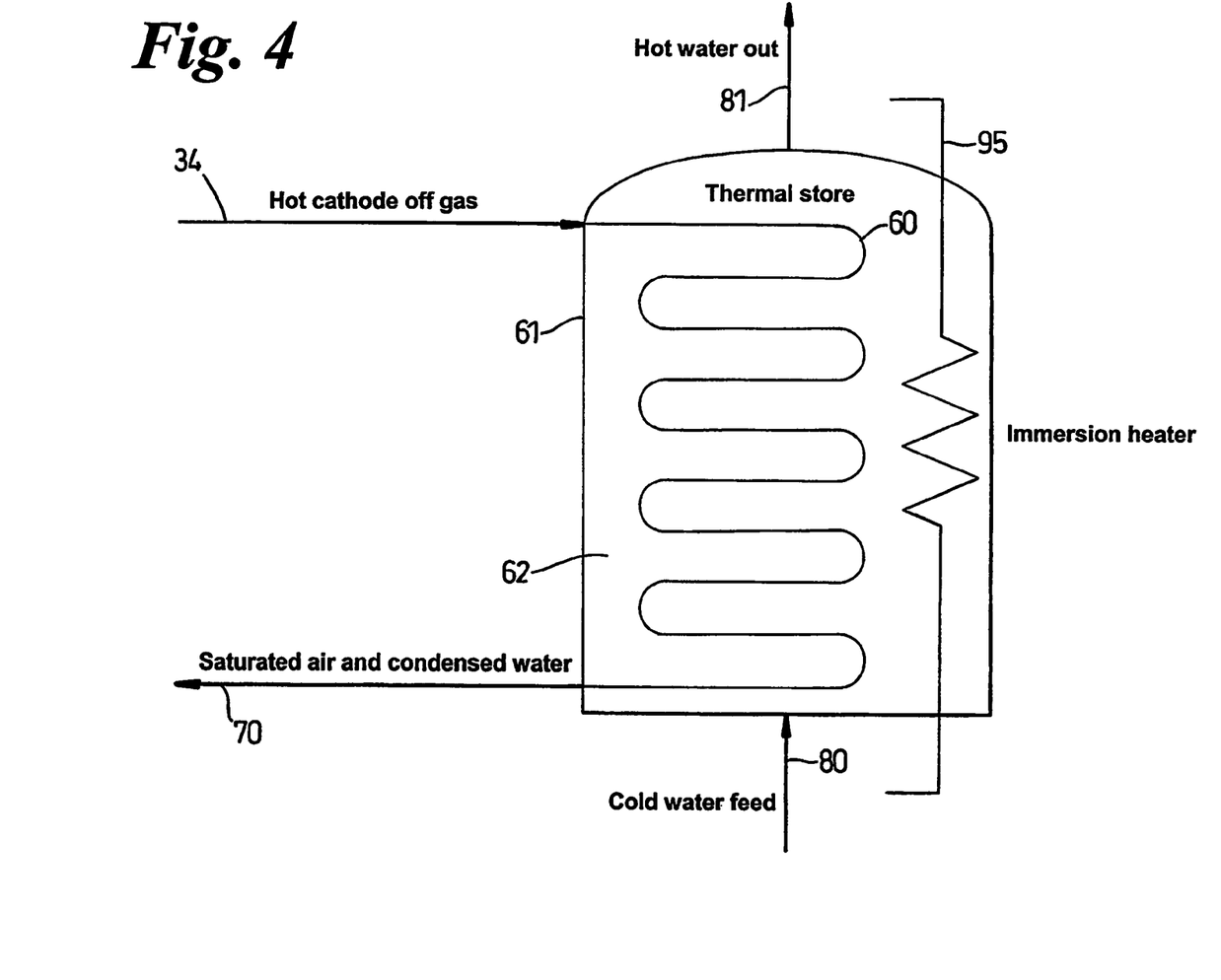
FIG. 4 is a schematic diagram of an alternative thermal storage tank with immersion heater for use in the system of FIG. 3.

When external electrical load conditions are high, a substantial quantity of thermal energy will be generated and this can be stored for later use in the thermal storage tank 61. Similarly, when the required external electrical load requirement is low, but demand for domestic hot water is high, the fuel cell stack 30 can simply be operated under full load, the electricity generated being used internally by the system to assist in directly heating the water jacket 62 using an immersion heater or similar. Such an arrangement is shown in FIG.

4, where the thermal storage tank 61 is fitted with an integral immersion heater 95 which is coupled to the electrical output supply 92. This not only provides direct heating of the water, but also by virtue of the electrical demand thereby placed on the fuel cell stack 30, increases the thermal output of the fuel cell being delivered to the thermal storage tank 61 via the cooling circuit.

Thus, the operation of the fuel cell is not constrained such that the thermal demand must match the electrical demand, and vice versa. The thermal storage tank 61 provides an effective decoupling of electrical and thermal demand of a combined heat and electrical power system.

Although the thermal storage tank 61 has been described as using a water jacket 62 in direct thermal contact with water in the cooling circuit heat exchanger coil 60, it will be understood that another form of thermal storage tank could be used, for example, any suitable mass of material having a high thermal capacity. This thermal storage tank can then be used to heat a water supply, if required.

In a typical exemplary fuel cell, the cathode exhaust 34 contains a water/water vapour mix at approximately 80° C. which proves ideal for maintaining a supply of domestic hot water through secondary water circuit 82. After heat exchanging, preferred embodiments described herein are capable, under selected operating conditions, of returning cooling water to the cooling water inlet 70 at temperatures between 30 and 60° C. Therefore, even for high power fuel cells, the cooling circuit of the present invention generally allows for dedicated cooling plates in the fuel cell stack to be eliminated and all the cooling to be effected by an evaporation and condensation mechanism.

Various modifications to the embodiments described above are possible. In the event that the amount of thermal energy extracted from the cathode exhaust 34 by the thermal storage tank 61 is insufficient, a further heat extraction mechanism may be provided.

Figure 5:
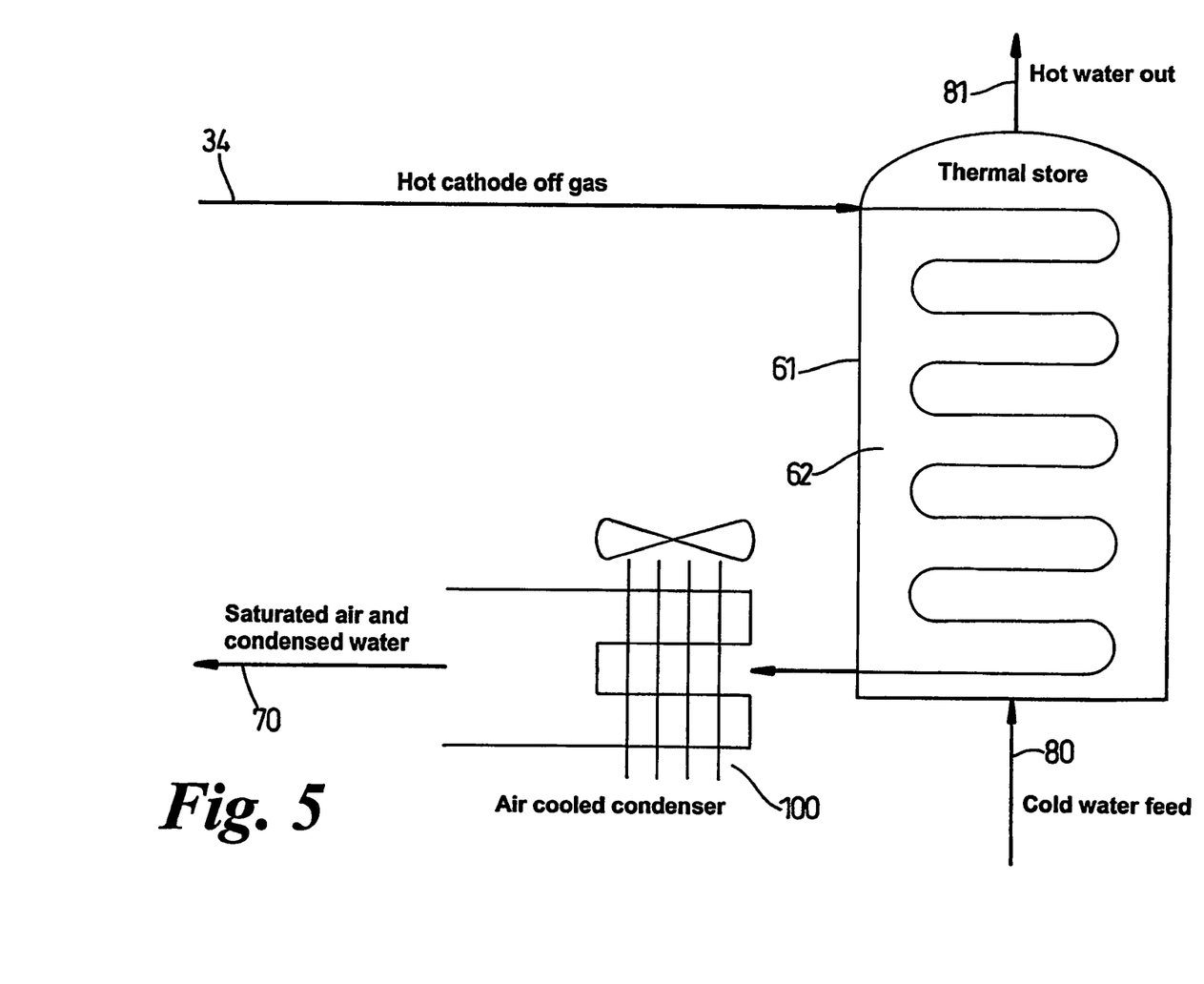
FIG. 5 is a schematic diagram of a thermal storage tank together with supplementary heat exchanger for use in the system of FIG. 3.

For example, in FIG. 5, an air cooled condenser unit 100 may be used in place of, or in addition to, the water collection vessel 63.

Figure 6:
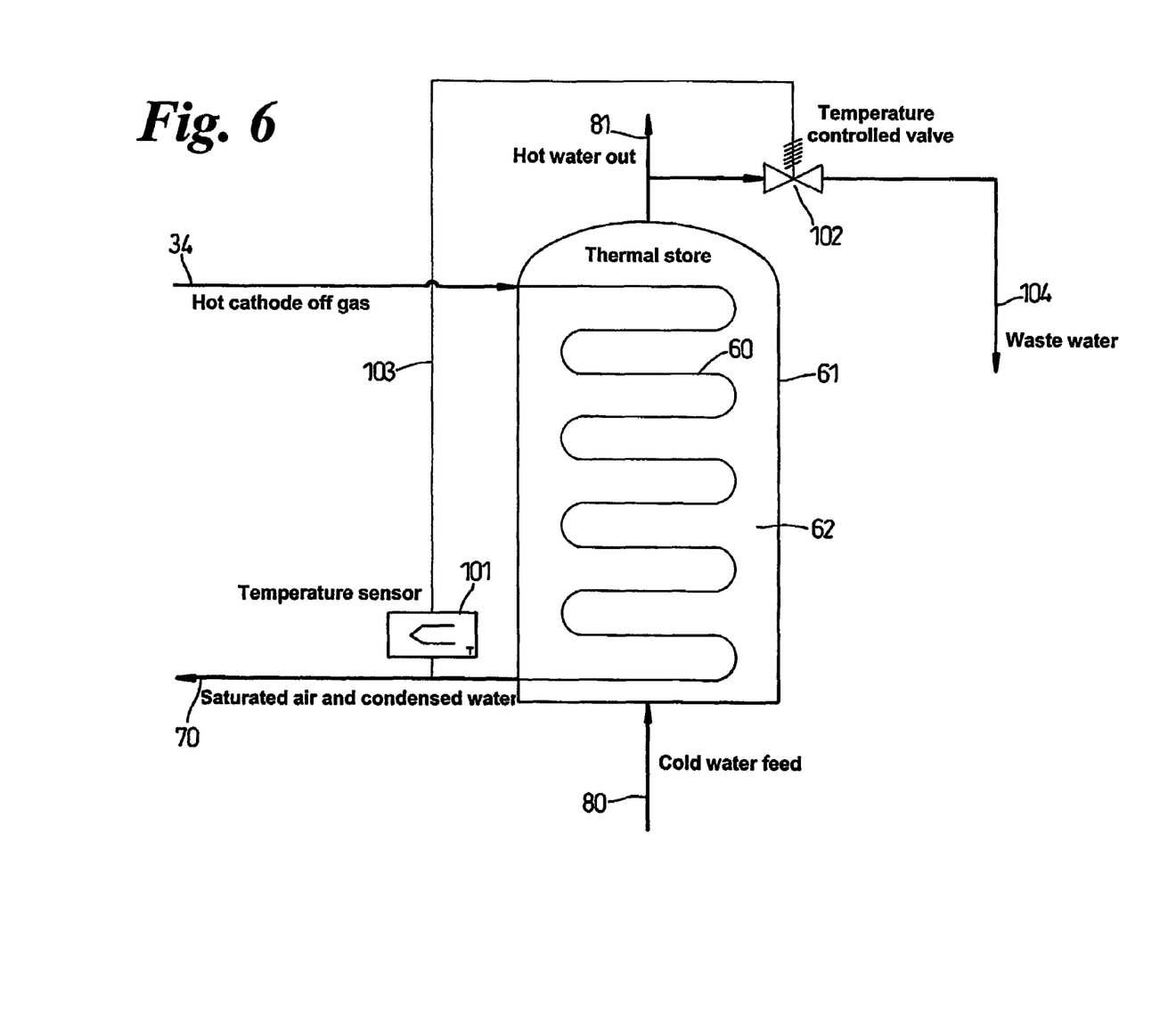
FIG. 6 is a schematic diagram of a thermal storage tank together with a excess waste heat dissipation mechanism for use in the system of FIG. 3.

In a still further arrangement, shown in FIG. 6, excess thermal energy can be drawn off the system by way of a waster water outlet 104 connected to the hot water outlet 81, under the control of a temperature sensor 101 in the outlet of the thermal storage tank 61 feeding the water inlet 70. The temperature sensor 101 controls a valve 102 by way of feedback line 103 to bleed off hot water, which is replenished with cold water from the cold water feed 80, when the water inlet 70 exceeds a predetermined temperature.

It will be understood that the water inlet 70 may be used to supply not only the fuel cell stack anodes and/or cathodes for the purposes of cooling and humidification, but may also be used to supply separate cooling plates situated between selected ones of the fluid flow field plates, if desired.

Other embodiments are intentionally within the scope of the appended claims.

The invention claimed is:

1. A fuel cell assembly comprising:
    a fuel cell stack comprising at least one inlet port for receiving cooling water, the at least one inlet port being connected to a fluid flow plate to deliver the cooling water to a membrane-electrode assembly adjacent to the fluid flow plate, the fuel cell stack further comprising at least one outlet port for discharging water and/or water vapor from the membrane-electrode assembly; and
    a thermal storage tank comprising a heat exchanger conduit therethrough, the heat exchanger conduit comprising an inlet and an outlet coupled respectively to the at least one outlet port and the at least one inlet port of the fuel cell stack to form a cooling circuit for the fuel cell stack, the cooling circuit for recycling discharged water and/or water vapor directly to the membrane-electrode assembly.

2. The fuel cell assembly of claim 1, further comprising a condensate collection unit in the cooling circuit between the heat exchanger outlet and the at least one inlet port of the fuel cell stack.

3. The fuel cell assembly of claim 1, further comprising a water pump in the cooling circuit between the heat exchanger outlet and the at least one inlet port of the fuel cell stack.

4. The fuel cell assembly of claim 1, wherein the thermal storage tank comprises a water jacket surrounding the heat exchanger conduit.

5. The fuel cell assembly of claim 4, wherein the water jacket further comprises a cold water feed and a hot water draw off point.

6. The fuel cell assembly of claim 4, further comprising an electrical heating element for heating the water jacket, the electrical heating element being coupled to an electrical output of the fuel cell stack.

7. The fuel cell assembly of claim 1, further comprising a pressure regulation means for controllably exhausting waste gases from the cooling circuit.

8. The fuel cell assembly of claim 1, wherein the thermal storage tank comprises a secondary water circuit passing therethrough for supplying a space heating radiator system.

9. The fuel cell assembly of claim 1, wherein the at least one inlet port of the fuel cell stack receiving water from the cooling circuit is coupled to a direct water injection system of anodes and/or cathodes in the fuel cell stack.

10. The fuel cell assembly of claim 1, wherein the at least one inlet port of the fuel cell stack receiving water from the cooling circuit is coupled to provide preheat of fuel and/or oxidant supply to anodes/cathodes.

11. The fuel cell assembly of claim 5, further comprising a valve coupled between the hot water draw off point and a waste water outlet, and a temperature sensor in the cooling circuit for actuating the valve when the water in the cooling circuit exceeds a predetermined temperature.

12. The fuel cell assembly of claim 1, wherein the at least one outlet port comprises a cathode exhaust port.

13. A method of operating a fuel cell assembly, comprising:
    feeding fuel and oxidant into a fuel cell stack to generate electrical current and water/water vapor by-product;
    feeding the water/water vapor into a heat exchanger conduit of a thermal storage tank and extracting thermal energy therefrom;
    retrieving water and/or vapor condensate from the heat exchanger conduit and supplying the water and/or vapor condensate to a membrane-electrode assembly in the fuel stack; and
    storing the thermal energy in the thermal storage tank,
    the fuel cell stack and heat exchanger conduit forming a water cooling circuit, the water cooling circuit for retrieving the water and/or vapor condensate from the heat exchanger conduit and supplying the water and/or vapor condensate directly to the membrane-electrode assembly in the fuel stack.

14. The method of claim 13, further comprising collecting the retrieved water and/or vapor condensate in a condensate collection unit in the cooling circuit between the heat exchanger and an inlet port of the fuel cell stack.

15. The method of claim 13, further comprising storing the thermal energy in a water jacket of a thermal storage tank.

16. The method of claim 15, further comprising drawing off heated water from the water jacket and replenishing with cold water.

17. The method of claim 13, further comprising heating water in a second water circuit from the thermal storage tank.

18. The method of claim 13, further comprising providing the retrieved water and/or vapor condensate as input to a direct water injection system of anodes and/or cathodes in the fuel cell stack.

19. The method of claim 13 further comprising providing the retrieved water and/or water vapor condensate to the fuel cell stack for preheat of fuel and/or oxidant supply to anodes/cathodes.

20. A fuel cell assembly comprising:
- a fuel cell stack comprising at least one inlet port for receiving cooling water and at least one outlet port for discharging water and/or water vapor, the at least one inlet port and the at least one outlet port each communicating with at least one membrane electrode assembly of the fuel cell stack;
- a thermal storage tank comprising a heat exchanger conduit therethrough, the heat exchanger conduit having an inlet and an outlet coupled respectively to the at least one outlet port and the at least one inlet port of the fuel cell stack to form a cooling circuit for the fuel cell stack; and
- a pressure regulation means for controllably exhausting waste gases from the cooling circuit.

21. A fuel cell assembly comprising:
- a fuel cell stack comprising at least one inlet port for receiving cooling water and at least one outlet port for discharging water and/or water vapor, the at least one inlet port and the at least one outlet port each communicating with at least one membrane electrode assembly of the fuel cell stack;
- a thermal storage tank comprising a heat exchanger conduit therethrough, the heat exchanger conduit having an inlet and an outlet coupled respectively to the at least one outlet port and the at least one inlet port of the fuel cell stack to form a cooling circuit for the fuel cell stack, the thermal storage tank comprising a water jacket surrounding the heat exchanger conduit, the water jacket comprising a cold water feed and a hot water draw off point;
- a valve coupled between the hot water draw off point and a waste water outlet; and
- a temperature sensor in the cooling circuit for actuating the valve when the water in the cooling circuit exceeds a predetermined temperature.

* * * * *